(12) United States Patent
Wang et al.

(10) Patent No.: US 10,769,983 B2
(45) Date of Patent: Sep. 8, 2020

(54) BACKLIGHT MODULE AND METHOD FOR MANUFACTURING THE SAME, AND DISPLAY DEVICE

(71) Applicant: XIAMEN TIANMA MICRO-ELECTRONICS CO., LTD., Xiamen (CN)

(72) Inventors: Hailiang Wang, Xiamen (CN); Binyi Zheng, Xiamen (CN); Yan Yang, Xiamen (CN); Ling Wu, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/258,651

(22) Filed: Jan. 27, 2019

(65) Prior Publication Data
US 2019/0156735 A1 May 23, 2019

(30) Foreign Application Priority Data
Oct. 31, 2018 (CN) .......................... 2018 1 1291152

(51) Int. Cl.
*G09G 3/32* (2016.01)
*G02F 1/13357* (2006.01)
*H05B 45/10* (2020.01)
*G09G 3/34* (2006.01)

(52) U.S. Cl.
CPC .......... *G09G 3/32* (2013.01); *G02F 1/133603* (2013.01); *H05B 45/10* (2020.01); *G09G 3/3426* (2013.01)

(58) Field of Classification Search
CPC .......... G09G 3/32; G09G 3/3426; G09G 3/36; G02F 1/133603; G02F 1/1336; H05B 45/10
See application file for complete search history.

(56) References Cited

U.S. PATENT DOCUMENTS

| 6,361,180 B1* | 3/2002 | Iimura | ............. G02F 1/133615 362/551 |
| 2005/0286846 A1* | 12/2005 | Bayley | ..................... G02B 6/06 385/116 |

(Continued)

FOREIGN PATENT DOCUMENTS

CN              105093662 A         11/2015

*Primary Examiner* — Alexander Eisen
*Assistant Examiner* — Cory A Almeida
(74) *Attorney, Agent, or Firm* — Kilpatrick Townsend & Stockton, LLP (57) ABSTRACT

The present disclosure relates to a backlight module, a method for manufacturing the backlight module, and a display device. The backlight module includes a substrate, a plurality of LED chips, and a first film having a plurality of channels. Each channel is filled with a channel filling portion. A refractive index n1 of the first film is smaller than a refractive index of the channel filling portion is n2. The first film has a first region and second region. Channels in the first region are astigmatism holes for diverging the light having a high intensity and channels in the second region are light-converging holes for converging the light having a low intensity, thereby alleviating or eliminating the starry phenomenon.

14 Claims, 9 Drawing Sheets (56) References Cited

U.S. PATENT DOCUMENTS

2007/0153545 A1* 7/2007 Lee .................. G02B 6/0073
362/610
2008/0117360 A1* 5/2008 Cernasov ............. G02B 6/0048
349/65

* cited by examiner

FIG. 1

( Prior Art )

FIG. 2

( Prior Art )

FIG. 3

( Prior Art )

(Prior Art)

Uniform brightness

| preparing the substrate and a finished film layer, wherein the plurality of LED chips is electrically connected to a surface of the substrate | S1 |

↓

| arranging the finished film layer on a side of the plurality of LED chips facing away from the substrate in such manner that the finished film layer covers at least one LED chip of the plurality of LED chips | S2 |

BACKLIGHT MODULE AND METHOD FOR MANUFACTURING THE SAME, AND DISPLAY DEVICE

CROSS-REFERENCE TO RELATED APPLICATIONS

The present disclosure claims priority to Chinese Patent Application No. 201811291152.6, filed on Oct. 31, 2018, the content of which is incorporated herein by reference in its entirety.

FIELD

The present disclosure relates to the field of display technology and, in particular to a backlight module, a method for manufacturing the backlight module, and a display device.

BACKGROUND

With the development of light-emitting diode (LED) technology, the LED light source used in the backlight module has a smaller size, and Mini LED is gradually used as the light source in the backlight module. The Mini LED is also referred as to Micro Light Emitting Diode (Micro LED) that has a size of approximately 50 μm to 300 μm.

The Mini LED is an emerging branch of the current display screen. This technology can realize a local dimming design of a straight-down type backlight module, so as to achieve a high dynamic range screen effect (HDR), which makes pictures more delicate. At the same time, a high-brightness surface light source is provided to increase brightness of the module. The local dimming design also reduces power consumption of the backlight module.

However, the backlight module formed by the Mini LED known in the prior art is prone to a starry phenomenon during display. That is, the brightness in region corresponding to the LED chips is relatively high, but the brightness in region between adjacent LED chips is relatively low.

SUMMARY

The present disclosure provides a backlight module, a method for manufacturing the backlight module, and a display device, in order to solve the problem of a starry phenomenon in display process of the backlight module known in the prior art.

In one embodiment, the present disclosure provides a backlight module. The backlight module includes a substrate, a plurality of LED chips arranged on a side of the substrate and electrically connected to the substrate, and a first film disposed on a side of at least one LED chip of the plurality of LED chips facing away from the substrate. An orthographic projection of the at least one LED chip on a plane of the substrate is located within an orthographic projection of the first film on the plane of the substrate. The first film has a plurality of channels penetrating through the first film. Each of the plurality of channels includes a first side close to the at least one LED chip and a second side facing away from the at least one LED chip. Each of the plurality of channels is filled with a channel filling portion having a first end surface located on the first side and a second end surface located on the second side. The first film has a refractive index n1, and the channel filling portion has a refractive index n2, where n2>n1. The first film has a first region and a second region surrounding the first region, an orthographic projection of the first region on the plane of the substrate at least partially overlaps with an orthographic projection of the at least one LED chip of on the plane of the substrate. In the first region, an area of the first end surface of the channel filling portion is smaller than an area of the second end surface of the channel filling portion in a same channel; and in the second region, an area of the first end surface of the channel filling portion is larger than an area of the second end surface of the channel filling portion in a same channel.

One embodiment of the present disclosure provide a method for manufacturing the backlight module according to another embodiment. The method includes: preparing the substrate and a finished film layer, where the plurality of LED chips is electrically connected to a surface of the substrate; and arranging the finished film layer on a side of the plurality of LED chips facing away from the substrate in such manner that the finished film layer covers at least one LED chip of the plurality of LED chips. The finished film layer includes a first film and a channel filling portion.

In another embodiment of the present disclosure provides a display device. The display device includes a display panel, and the backlight module according to another embodiment. The backlight module is configured to provide backlight to the display panel.

BRIEF DESCRIPTION OF DRAWINGS

In order to illustrate the embodiments of the present disclosure, drawings used in embodiments according to the present disclosure or description of the prior art will be briefly described below.

DESCRIPTION OF EMBODIMENTS

As described in the background, in the backlight module formed by the Mini LED in the prior art, the starry phenomenon is likely to occur during display.

The inventor found that the above phenomenon can be ascribed to following reasons.

Figure 1:
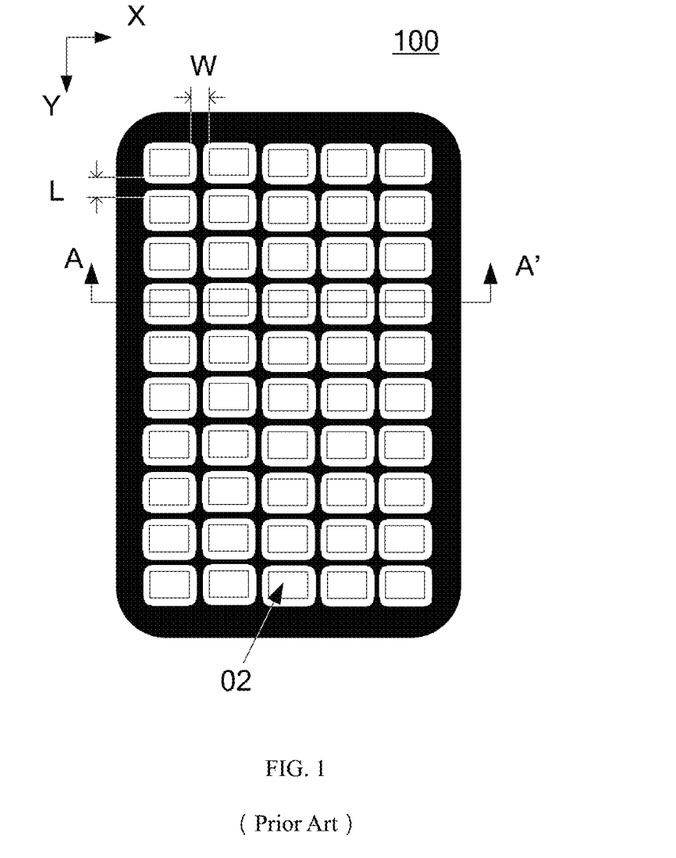
FIG. 1 is a schematic top view of a display device in the prior art.
Figure 2:
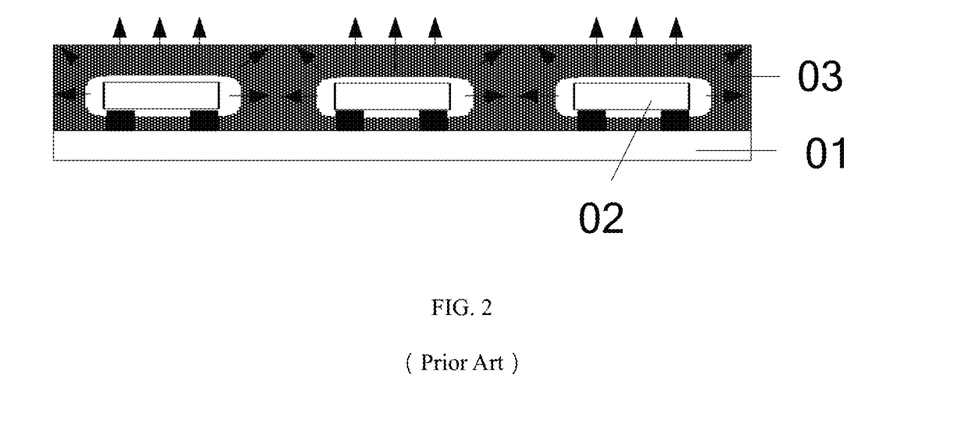
FIG. 2 is a schematic diagram of a cross section of the backlight module taken along line AA' in FIG. 1.

FIG. 1 is a top view of a display device 100 in the prior art. In this display device 100, a certain spacing is reserved between adjacent LED chips 02. For example, every two adjacent LED chips in an X direction are spaced from each other by a first space W, and every two adjacent LED chips 02 in a Y direction is spaced from each other by a second space L. FIG. 2 is a schematic diagram of a cross section of the backlight module taken along line AA' in FIG. 1, in which the LED backlight module includes a PCB plate 01, a plurality of LED chips 02 disposed on the PCB plate 01, and a fluorescent film 03 disposed on the plurality of LED chips 02. The LED chips 02 emit light mainly in a direction away from the PCB plate 01, and less in a lateral direction.

Figure 3:
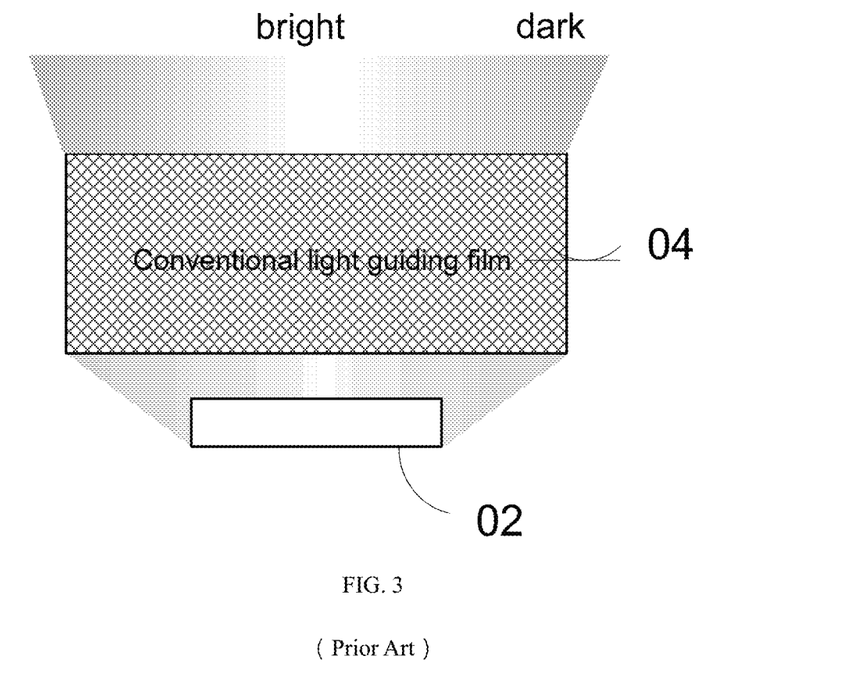
FIG. 3 is a structural schematic diagram of a backlight module in the prior art.

A light guiding film or a diffusion film is known in the prior art to be used for mixing light of the LED chips, so that the LED chips emit more uniform light. However, as shown in FIG. 3, which is a structural schematic diagram of a backlight module in the prior art, due to a limited light diffusion capability of the diffusion film or the light guiding film 04 in the prior art, a distribution of light intensity is still nonuniform even after being diffused.

When the LEDs in the backlight module emit light, due to less lateral light and absence of light-emitting element disposed in the above-mentioned spaces, the brightness in the region between two adjacent LED chips is relatively dark, which in turn causes the starry phenomenon of the backlight module. That is, the brightness in the region corresponding to the LED chips is high, the brightness in the region between adjacent two LED chips is low. AS result, the starry phenomenon of un-uniform brightness and darkness will also occur during displaying of pictures on the display panel.

In view of this, the present disclosure provides a backlight module. The backlight module includes: a substrate, a plurality of LED chips arranged on one side of the substrate and electrically connected to the substrate, and a first film. The first film is disposed on a side of at least one of the plurality of LED chips facing away from the substrate. An orthographic projection of the at least one LED chip of the plurality of LED chips on a plane of the substrate is located within an orthographic projection of the first film on the plane of the substrate. The first film has a plurality of channels penetrating through the first film, and each of the plurality of channels includes a first side close to the at least one LED chip and a second side acing away from the at least one LED chip. Each of the plurality of channels is filled with a channel filling portion having a first end surface on the first side and a second end surface on the second side. The first film has a refractive index n1, the channel filling portion has a refractive index n2, where n2>n1. The first film has a first region and a second region surrounding the first region, an orthographic projection of the first region on the plane of the substrate at least partially overlaps an orthographic projection of the at least one LED chip on the plane of the substrate. In the first region, an area of the first end surface of the channel filling portion in one channel is smaller than an area of the second end surface of the channel filling portion in the same channel. In the second region, an area of the first end surface of the channel filling portion in one channel is larger than an area of the second end surface of the channel filling portion in the same channel.

Based on the above configurations of the backlight module provided by the present disclosure, since the refractive index of the channel filling portion is greater than the refractive index of the first film, when the light emitted from the LED chips is transmitted in the channels, total reflection occurs, forming a transmission mode similar to an optical waveguide. Further, as the first film includes the first region and the second region surrounding the first region, and a cross section of the channel in the first region has a gradually increasing dimension along a direction away from the LED chip, while a cross section the channel in the second region has a gradually decreasing dimension along the direction away from the LED chip. That is, the channels in the first region are astigmatism holes having a small light-entering area and a large light-emitting area, and the channels in the second region are light-converging holes having a large light-entering area and a small light-emitting area. Therefore, the light that directly close to the LED chips and has a high light intensity can be diverged through the astigmatism holes, and the light that is farther from centers of the LED chips and has a low light intensity is converged by the light-converging holes, so that light intensity of positions between adjacent LED chips is comparable to light intensity of positions directly facing the LED chips, thereby alleviating or eliminating the starry phenomenon.

Embodiments of the present disclosure are described in detail with reference to the accompanying drawings. It should be noted that the described embodiments are only a part of the embodiments of the present disclosure, rather than all of the embodiments.

Figure 4:
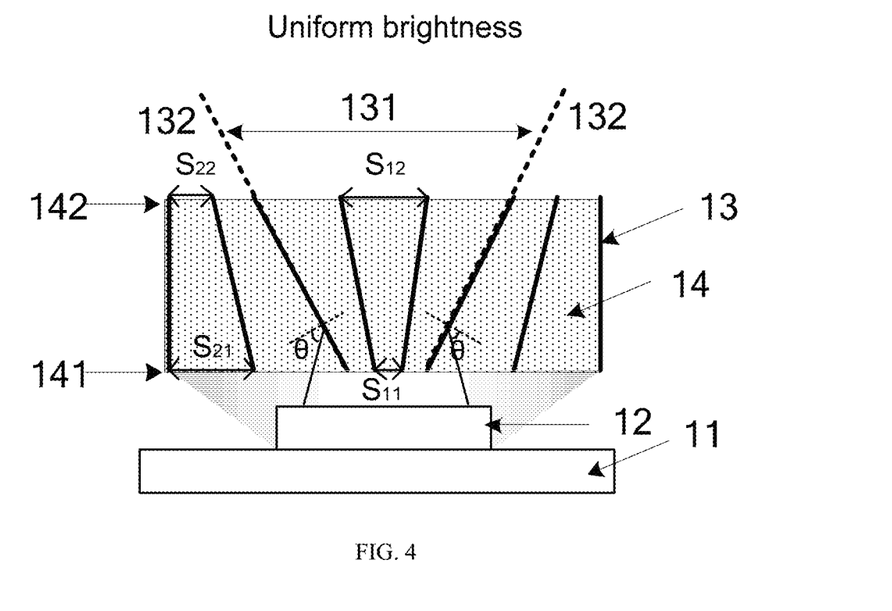
FIG. 4 is a structural schematic diagram of a backlight module according to an embodiment of the present disclosure.

Referring to FIG. 4, which is a structural schematic diagram of a backlight module according to an embodiment of the present disclosure, the backlight module includes: a substrate 11, a plurality of LED chips 12 disposed on one side of the substrate 11 and electrically connected to the substrate 11, and a first film 13 disposed on a side of at least one LED chip 12 of the plurality of LED chips 12 facing away from the substrate 11. An orthographic projection of the at least one LED chip on a plane of the substrate 11 is located within an orthographic projection of a corresponding first film 13 on the plane of the substrate 11.

The first film 13 has a plurality of channels penetrating through the first film 13, and each channel includes a first side close to the LED chips and a second side away from the LED chips. Each channel is filled with a channel filling portion 14, and the channel filling portion 14 includes a first end surface 141 at the first side and a second end surface 142 at the second side. The first film 13 has a refractive index n1, and the channel filling portion 14 has a refractive index n2, where n2>n1.

The first film 13 includes a first region 131 and a second region 132 surrounding the first region 131. An orthographic projection of the first region 131 on the plane of the substrate 11 at least partially overlaps an orthographic projection of the at least one LED chip 12 on the plane of the substrate 11. In the first region 131, an area of the first end surface 141 of the channel filling portion 14 in one channel is smaller than an area of the second end surface 142 of the channel filling portion 14 in the same channel. In the second region 132, an area of the first end surface 141 of the channel filling portion 14 in one channel is larger than an area of the second end surface 142 of the channel filling portion 14 in the same channel.

FIG. 4 aims to illustrate a relationship of the area of the first end surface 141 and the second end surface 142 of the channel filling portion 14 in the first region 131 and the second region 132. In the present embodiment, in the first region 131, the first end surface of the channel filling portion 14 has an area $S_{11}$, the second end surface of the channel filling portion 14 has an area $S_{12}$, and the area $S_{11}$ is smaller than the area $S_{12}$. In the second region 132, the first end surface of the channel filling portion 14 has an area $S_{21}$, the second end surface of the channel filling portion 14 has an area $S_{22}$, and the area $S_{21}$ is larger than the area $S_{22}$.

As can be seen from FIG. 4, in the present embodiment, the first film 13 has channels, the light emitted from the LED chip 12 firstly enters the channel filling portion 14 from the first end surface 141 facing the LED chip, then passes through the channel filling portion 14, and goes out of the channel from the second end surface 142. Therefore, for convenience of description of the embodiment, the first end surface 141 of the channel filling portion 14 can be regarded as a light inlet of the channel of the first film, while the second end face 142 of the channel filling portion 14 can be regarded as a light outlet of the channel of the first film. In the present embodiment, it is only needed to satisfy that the light inlet of the channel has a smaller size than the light outlet of the channel in the first region 131, and the light inlet of the channel has a larger size than the light outlet of the channel in the second region 132.

In this way, the light enters the channel filling portion 14 in the first region 131 in a relatively smaller amount, but is diverged to in a larger area when outgoing, so that the light emitted from the LED chip that has a relatively high intensity and brightness is diverged and thus uniformly distributed in a larger area, thereby lowering a light intensity per unit area. In the meantime, the light enters the channel filling portion 14 in the second region 132 in a relatively larger amount, but is converged in a smaller area when outgoing, so that the light emitted from the LED chip that a relatively low intensity and brightness is converged and thus uniformly distributed in a smaller area.

In this embodiment, the refractive index n1 of the first film 13 is greater than the refractive index n2 of the channel filling portion 14, when the light emitted from the LED chip enters the channel filling portion 14 and is transmitted to an interface between the channel filling portion 14 and the first film 13, i.e., the light enters an optically thinner medium from an optically denser medium, the light will be totally reflected on the interface between the first film 13 and the channel filling portion 14 as long as an incident angle θ of the light incident on the interface satisfies:

$$\theta \geq \arcsin\frac{n_2}{n_1}.$$

In this way, the light emitted from the LED chip reaches the channel filling portion 14 and is transmitted in the channel, resulting an effect similar to an optical fiber transmission. When light incident on the first film 13 is transmitted to the interface between the channel filling portion 14 and the first film 13, i.e., the light is entering an optically denser medium from an optically thinner medium, the light will be refracted and enter the channel filling portion 14. If incident angle θ of the light incident on the interface satisfies:

$$\theta \geq \arcsin\frac{n_2}{n_1},$$

the light incident on the first film 13 will also be totally reflected on the interface between the first film 13 and the channel film materiel 14 so as to be transmitted in the channel.

By means of configuration of the channels in the first film, the nonuniform light emitted from the LED chips is redistributed in the first region 131 and the second region 132, so that the light can be uniform after passing through the first film. Compared with a conventional light guiding film or diffusion film in the prior art, the backlight module according to the present embodiment has an improved capability of distributing light intensity, and the light emitted from the LED chips can be redistributed after passing through the first film, so that the brightness of the LED chips becomes uniform, thereby alleviating or even eliminating the starry phenomenon.

It should be understood that a number of the channels in the first region 131 and a number of the channels the second region 132 are not limited in the present disclosure, and the specific number can be set depending on actual requirement. At the same time, the first film 13 is only represented with black lines in the drawings, and its dimension can vary in accordance with the actual requirement, which is not limited in the present disclosure.

It should be noted that, in the embodiment of the present disclosure, the shape and the positional relationship between the first end surface and the second end surface of the channel filling portion are not strictly limited, as long as each of the channels in the first region 131 is a light hole having a small light inlet and a large light outlet, while each of the channels in the second region 132 is a light hole having a large light inlet and a small light outlet. In this way, the light emitted from the LED chip with a higher light intensity can be diverged, and the light emitted from the LED chip with a lower light intensity can be converged, so that the light, after passing through the first film, can be uniformly distributed. The first end surface and the second end surface of the channel filling portion can have a same shape or different shapes. For the convenience of manufacturing, in a same channel, the first end surface and the second end surface of the channel filling portion have a same shape in the present embodiment.

Figure 5:
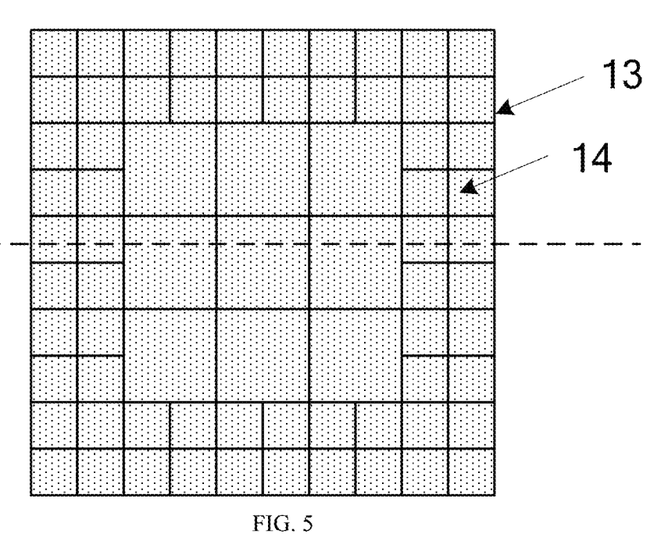
FIG. 5 is a top view of a first film according to an embodiment of the present disclosure, in which a second end surface of a channel filling portion has a shape square.

The shape of the first end surface of the channel filling portion can be regular or irregular. For the convenience of manufacturing, in the present embodiment, the first end surface and the second end surface of the channel filling portion in a same channel both have a shape of circle or polygon. The shape of polygon can be any polygon such as regularly shaped triangle, square, rectangle, and equilateral pentagon, or irregularly shaped triangle, quadrangle, pentagon, and the like. Referring to FIG. 5, which is a top view of the first film according to an embodiment of the present disclosure, the second end surface of the channel filling portion has a shape of square. In FIG. 5, in the first region, each square on the second end surface has a longer edge length, while the corresponding square on first end surface of each square has a smaller area; and in the second region, each square on the second end surface has a shorter edge length, while the corresponding square on the first end surface has a larger area.

Figure 6:
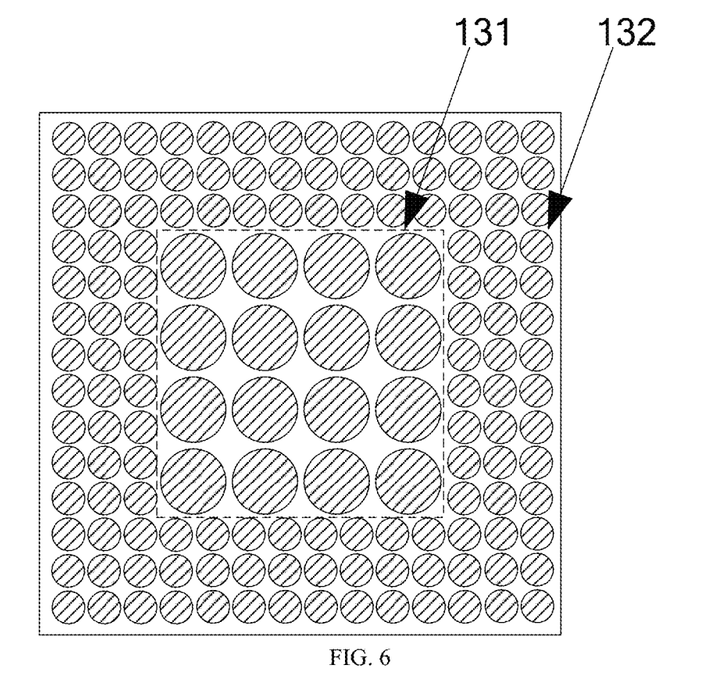
FIG. 6 is a top view of a first film according to another embodiment of the present disclosure.

In addition, referring to FIG. 6, which is a top view of the first film according to another embodiment of the present disclosure, both the first end surface and the second end surface of the channel filling portion in a same channel have a circular shape. A circular channel can totally reflect the light in all directions, and thus the amount of emitted light is relatively large, avoiding a situation that the light cannot be totally reflected. In this embodiment, in the first region 131 (for example the central region in FIG. 6), each circle has a larger diameter; and in the second region 132 (for example the peripheral region of FIG. 6), each circle has a smaller diameter. The specific distribution of the first region and the second region is not limited in the embodiment of the present disclosure, and may be set according to the light intensity of the actual LED chips.

It should be noted that, in the embodiment of the present disclosure, the position relationship between the first film and the LED chips is not limited, as long as the orthographic projection of the first region on the plane of the substrate at least partially overlaps the orthographic projection of the corresponding at least one LED chip on the plane of the substrate.

The existing LED chips can be divided into two types with respect to their light intensity distribution. In the first type, the light intensity is relatively high in a solid angle around the center of the LED chip, and becomes lower with a distance from the center of the LED chip. In the second type, the light intensity within a solid angle range around the center of the LED chip is highest, and becomes lower when getting closer to the center of the LED chip and when getting away from the center of the LED chip, but the light intensity at the center of the LED chip is still higher than that at the farthest edge of the LED chip.

Figure 7:
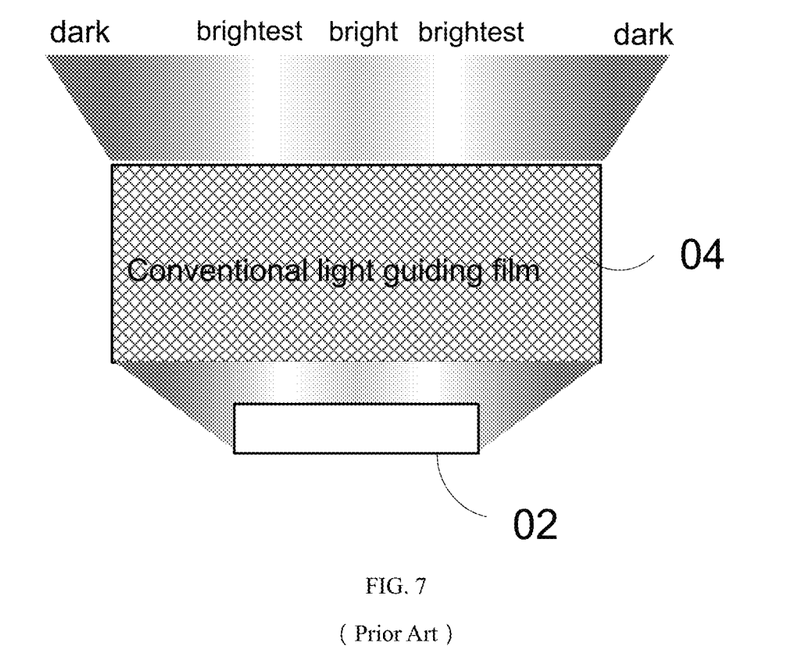
FIG. 7 is a structural schematic diagram of another backlight module in the prior art.

Referring to FIG. 7, which is a structural schematic diagram of another backlight module in the prior art, after the light is guided through a conventional film layer, the light intensity within in a solid angle around the center of the LED chip is still the highest, and becomes lower when getting closer to the center of the LED chip and when getting farther away from the center of the LED chip, but the light intensity at the center of the LED chip is higher than that at the farthest edge of the LED chip. As shown in FIG. 7, the light intensities of the emergent light can be divided into three degrees of dark, brightest and bright. The light intensity at the center of the LED chip is bright but not the brightest.

The first type of light intensity of distribution is shown in FIG. 4. In order to uniformly distribute the light emitted from the LED chip through the first film, in an embodiment of the present disclosure, a center of the orthographic projection of the first region of the first film on the plane of the substrate coincides with a center of the orthographic projection of the corresponding at least one LED chip on the plane of the substrate. Therefore, a region of the LED chip emitting light with a relatively higher light intensity corresponds to the first region of the first film and a region of the LED chip emitting light with a relatively lower light intensity corresponds to the second region of the first film. In this way, the relatively higher intensity of the light emitted from the LED chip becomes lower after the light passes through the astigmatism channel, and the relatively lower intensity of the light emitted from the LED chip becomes higher after the light passes through the converging channel. In this way, the nonuniformly distributed light emitted from the entire LED chip becomes uniform after passing through the first film.

Figure 8:
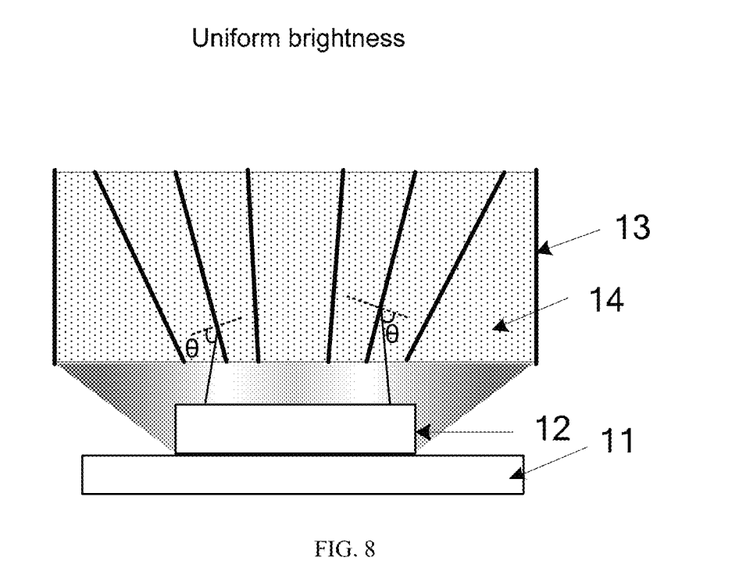
FIG. 8 is a structural schematic diagram of another backlight module according to an embodiment of the present disclosure.

The second type of the light intensity distribution is illustrated in FIG. 8. Accordingly, the area of the first end face and the second end face of the channel filling portion also vary with the light intensity of the LED chip.

In the embodiments of the present disclosure, it is necessary that the first film has a lower refractive index and the channel filling portion has a higher refractive index, in order to transmit the light emitted from the LED chip in the channel. The embodiments of the present disclosure do not limit specific materials of the first film and the channel filling portion, as long as they can realize the total reflection. In an embodiment of the present disclosure, the first film is acrylic (polymethyl methacrylate), and the channel filling portion is a resin having a high refractive index. The resin is processed by MR™ monomers and acrylic monomers containing sulfur and phosphorus atoms. In an embodiment, the channel filling portion is poly(2-methylallyl benzothiazolethiol ester).

It should be noted that the arrangement manner of the plurality of LED chips on the substrate is not limited in this embodiment. In an embodiment, the plurality of LED chips can be evenly distributed on the substrate. In another embodiment, the plurality of LED chips can be divided in groups each consisting of two, three or even more LED chips, and then these groups are evenly distributed on the substrate. The first film covers at least one LED chip, or one LED chip is provided with the first film. The center of the projection of the first film on the substrate coincides with the center of the projection of the corresponding LED chip on the substrate. In another embodiment, a group of LED chips is correspondingly provided with the first film, and the center of the projection of the first film on the substrate coincides with the center of the projections of the corresponding group of LED chips on the substrate in such manner that the first film completely covers the corresponding group of LED chips. In this way, the channels are provided in the first film depending on the light intensity distribution of the group of LED chips.

In order to facilitate the arrangement of the LED chip and the first film, in one embodiment of the present disclosure, the plurality of LED chips is arranged in a matrix on the substrate. That is, the LED chips are evenly distributed on the substrate. The parts of the first film are also evenly distributed, i.e., each of the plurality of LED chips is provided with a corresponding part of first film on a side thereof facing away from the substrate. The first film on the side of each of the plurality of LED chips facing away from the substrate side can be separated parts, or the first film on the plurality of LED chips is formed as an integral structure, which is not limited in the present embodiment. Since the plurality of LED chips is arranged in a matrix, a distance between every two adjacent LED chips is the same. Therefore, when the first film is formed as an integral structure, and each part of the first film covers one corresponding LED chip, and thus it is easier to align the first film and the LED chips.

Figure 9:
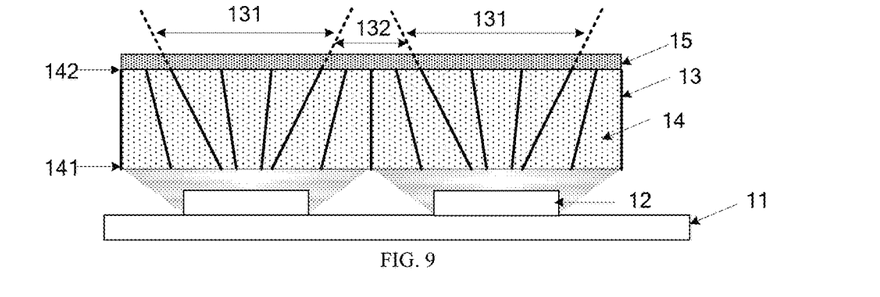
FIG. 9 is a structural schematic diagram of still another backlight module according to an embodiment of the present disclosure.
Figure 10:
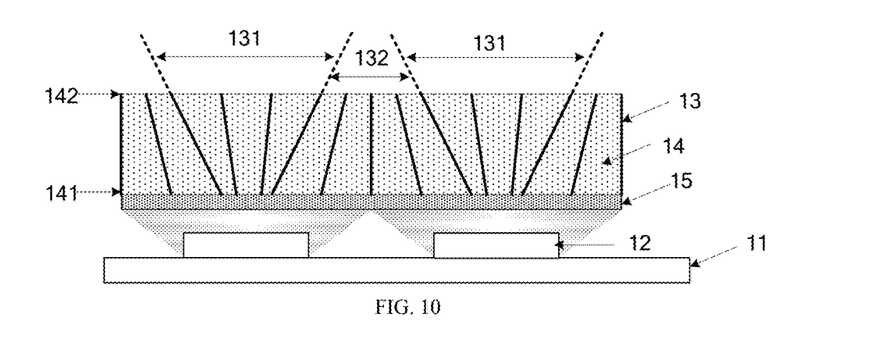
FIG. 10 is a structural schematic diagram of still another backlight module according to an embodiment of the present disclosure.

Referring to FIG. 9 and FIG. 10, which both are structural schematic diagrams of a backlight module according to an embodiment of the present disclosure, the backlight module further includes a fluorescent film 15. The fluorescent film 15 is configured to convert light emitted from the LED chips into light having different colors. For example, if the LED chip is a blue light chip, the fluorescent film can be a red-green fluorescent film (RG film), and red and green light is emitted under excitation of blue light, which provides a basis for a subsequent formation of a white backlight source. The specific position of the fluorescent film is not limited in the present disclosure. In an embodiment shown in FIG. 9, the fluorescent film 15 is located on a side of the first film 13 facing away from the LED chip 12, i.e., the light emitted from the LED chip is firstly uniformly distributed, and then excited by fluorescence to produce light of other colors. In another embodiment shown in FIG. 10, the fluorescent film 15 is located on a side of the first film 13 close to the LED chip 12, i.e., the light having other colors is firstly produced by florescence excitation, and then mixed to achieve a more uniform light intensity distribution.

In addition, the backlight module can further include a diffusion film that is configured to further diffuse the mixed light, so as to make the light distribution more uniform.

The backlight module provided by the embodiments of the present disclosure includes a substrate, a plurality of LED chips, and a first film. The first film is provided with a plurality of channels, and each channel is filled with a channel filling portion. The refractive index of the first film is n1, the refractive index of the channel filling portion is n2, and n2>n1. When the light emitted from the LED chip is transmitted in the channel, total reflection can occur to form a transmission mode similar as the optical waveguide due to the relationship of n2>n1. The first film includes a first region and a second region surrounding the first region. The channels in the first region have a cross-sectional dimension gradually increasing in a direction away from the LED chip, and the channels in the second region have across-sectional dimension gradually decreasing in a direction away from the LED chip. That is, the channels in the first region are astigmatism holes having a small light-entering area and a large light-output area; and the channels in the second region are light-converging holes having a large light-entering area and a small light-emitting area. Therefore, the light having a high light intensity directly facing the LED chips can be diverged through the astigmatism holes, and the light having a low light intensity farther from the centers of the LED chips is converged through the converging hole, so that the light intensity at positions directly opposite to the LED chips and at positions between adjacent LED chips, thereby alleviating or eliminating the starry phenomenon.

Figure 11:
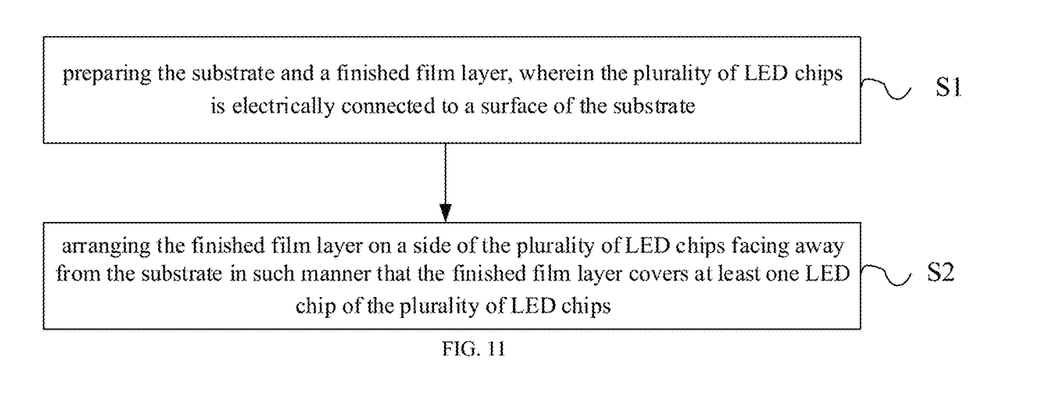
FIG. 11 is a flowchart of a method for manufacturing a backlight module according to an embodiment of the present disclosure.

The embodiments of the present disclosure further provides a method for manufacturing a backlight module as described above. FIG. 11 is flow chart of a method for manufacturing a backlight module according to an embodiment of the present disclosure.

The method for manufacturing the backlight module includes: S1, preparing the substrate and the finished film layer, and the plurality of LED chips is electrically connected to a surface of the substrate; and S2, arranging the finished film layer on a side of the plurality of LED chips facing away from the substrate in such manner that the finished film layer covers at least one LED chip of the plurality of LED chips.

The finished film layer includes a first film and a channel filling portion. The first film has a plurality of channels penetrating the first film. Each of the plurality of channels includes a first side close to the at least one LED chip and a second side facing away from the at least one LED chip. Each of the plurality of channels is filled with the channel filling portion. The channel filling portion includes a first end surface on the first side and a second end surface on the second side. A refractive index of the first film is n1, a refractive index of the channel filling portion is n2, and n2>n1. The first film has a first region and a second region surrounding the first region. An orthographic projection of the first region on the plane of the substrate at least partially overlaps an orthographic projection of the at least one LED chip on the plane of the substrate. In the first region, an area of the first end surface of the channel filling portion in one channel is smaller than an area of the second end surface of the channel filling portion in the same channel. In a second region, an area of the first end surface of the channel filling portion in one channel is larger than an area of the second end surface of the channel filling portion in the same channel.

The method provided in the embodiments of the present disclosure can be used to manufacture the backlight module described in the above embodiments, in which the first film can redistribute the light emitted from the LED chips, thereby emitting more uniform light from the backlight module, further alleviating or even eliminating the starry phenomenon.

In an embodiment, the step of preparing a substrate includes: providing a circuit board, and manufacturing a plurality of LED chips on the circuit board. The plurality of LED chips can be Mini LEDs having a size approximately between 50 µm and 300 µm. The embodiments of the present disclosure does not specify the arrangement of the LED chips. In an embodiment of the present disclosure, the plurality of LED chips is arranged in a matrix, in order to emit uniform light from the backlight module.

The process of preparing the finished film layer includes: preparing a first film having a plurality of channels penetrating the first film; and filling each of the plurality of channels with the channel filling portion to form the finished film layer.

The finished film layer provided in the embodiments of the present disclosure is a film layer including two kinds of material having different refractive indexes. In the manufacturing process, the first film having a plurality of channels is firstly formed, and a channel filling portion with a higher refractive index than the first film is filled in to the plurality of channels, eventually forming an entire first film.

In the present disclosure, in order to obtain the first film, the channels are formed before the filling process of the channel filling portion. Compared with a method in which the channel filling portion is firstly formed and then the material of the first film surrounds the channel filling portion to form the finished film layer, the method according to the embodiment of the present disclosure are easier.

It should be noted that, the manufacturing method of the first film is not limited in the present disclosure. In an embodiment of the present disclosure, the method for manufacturing the first film includes: providing a layer-shaped initial film layer, and forming a plurality of channels each penetrating the layer-shaped initial film by wet etching, so as to form the first film.

Figure 12:
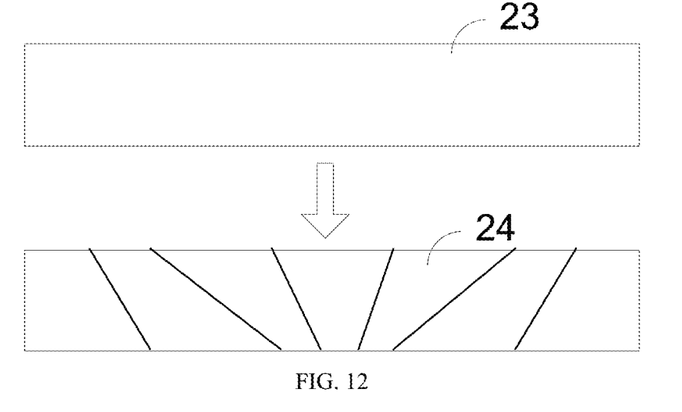
FIGS. 12-16 are steps of a method for manufacturing a first film according to an embodiment of the present disclosure.

Referring to FIG. 12, the plurality of channels 24 penetrating the layer-shaped initial film layer 23 is formed by wet etching process. The wet etching process has a relatively higher precision, and thus can precisely form the channels, thereby achieving a better light mixing effect.

In another embodiment of the present disclosure, the process of preparing the first film includes: providing a mold having a plurality of protrusions, where the plurality of protrusions has a same shape as the plurality of channels and a protrusion height of the plurality of protrusions with respect to the mold is greater than or equal to a distance between the first end surface and the second end face; coating a material of the first film on regions of the mold other than the plurality of protrusions; solidifying the material of the first film so as to form the first film; and removing the mold from the first film.

Figure 13:
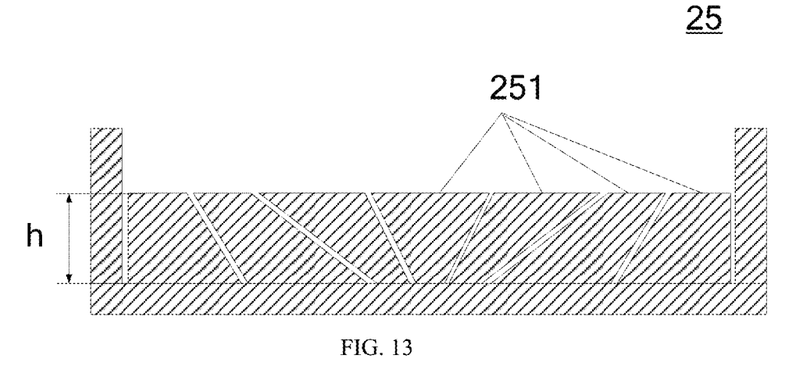

FIG. 13 is a specific structural schematic diagram of a mold. The mold 25 includes a plurality of protrusions 251 having a same shape as the channels to be formed. It should be noted that a protrusion height h of the protrusion 251 relative to the mold should be greater than or equal to the distance between the first end surface and the second end surface, in order to form the first film provided in the embodiments in a subsequent process.

Figure 14:
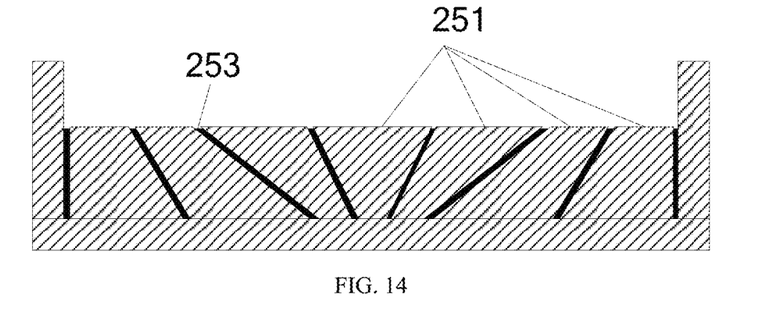

Referring to FIG. 14, the material of the first film 253 is coated on the mold in such manner that the material of the first film 253 fills regions other than the protrusions 251.

Figure 15:
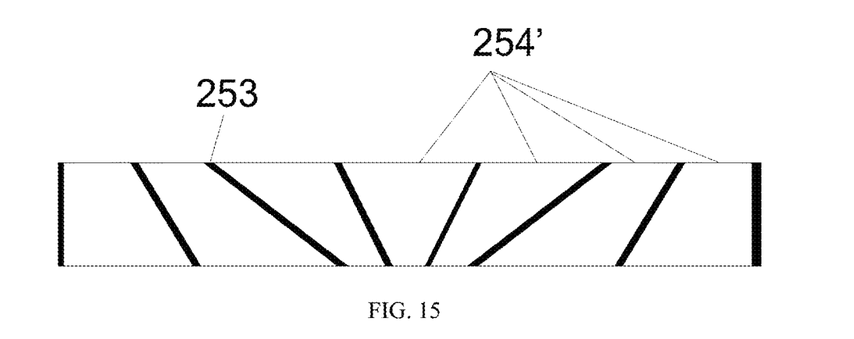

Referring to FIG. 15, the first film 253 includes a plurality of through-holes 254'.

The process of filling each of the plurality of channels with the channel filling portion to form the finished film layer includes: filling the plurality of channels with a material of the channel filing portion by coating.

Figure 16:
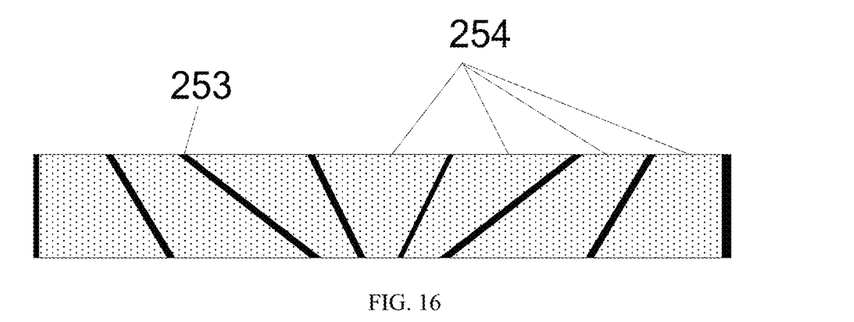

Referring to FIG. 16, the channel filling portion is filled in the channels 254' to form the first film covering the LED chips according to the embodiments of the present disclosure.

The method for manufacturing the first film with the mold and coating is a well-developed and high-efficiency process, and thus is suitable for mass production.

The method for manufacturing the backlight module provided in the present disclosure is adapted to form the backlight module as described in the above embodiments, in which the light emitted from the LED chips is more uniform, and the starry phenomenon is alleviated or even eliminated.

Figure 17:
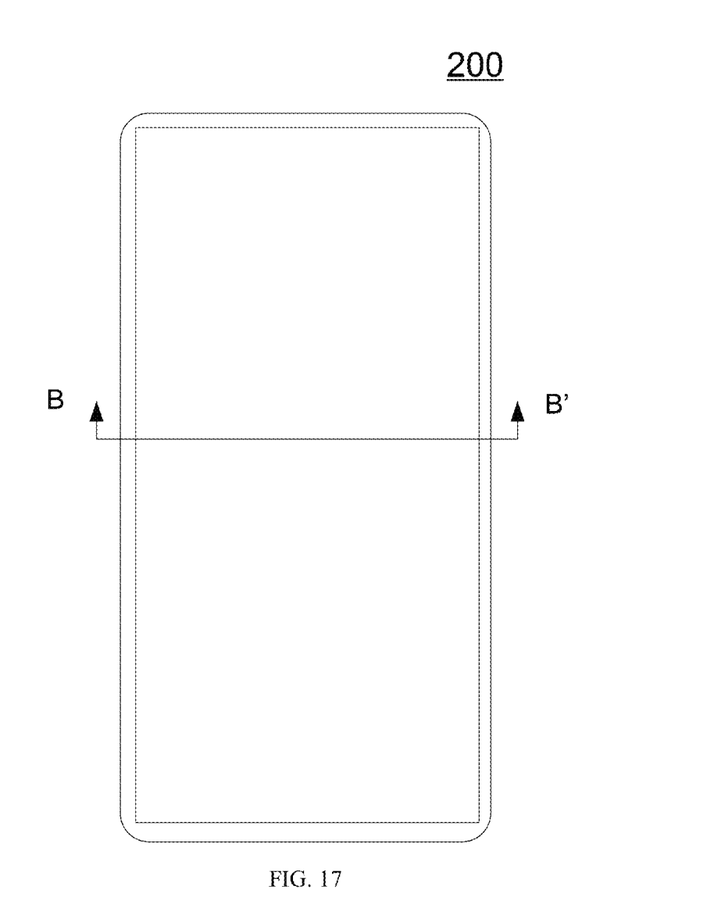
FIG. 17 is a structural schematic diagram of a display device according to an embodiment of the present disclosure.
Figure 18:
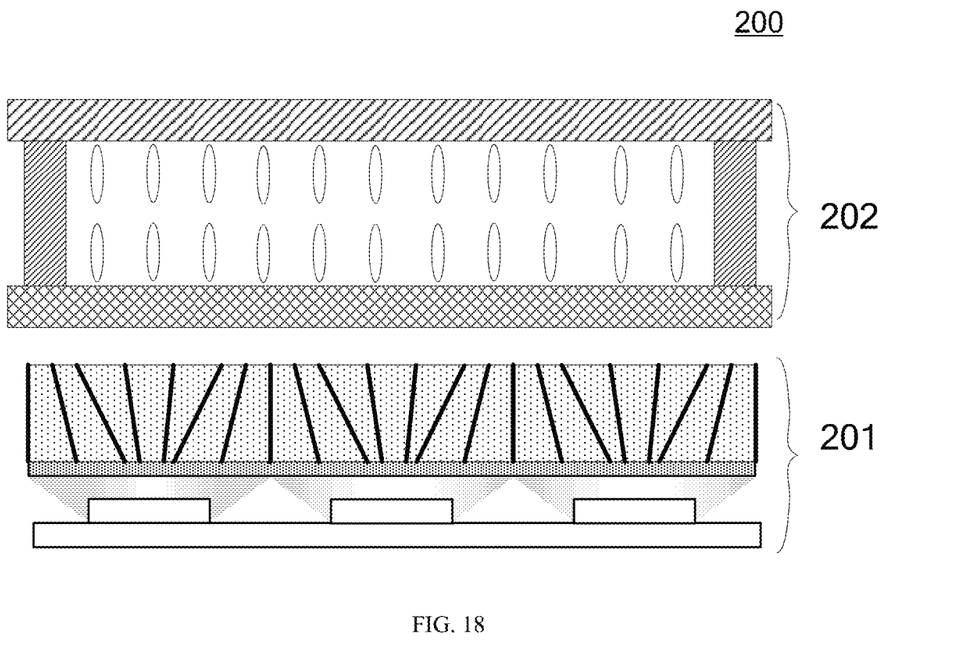
FIG. 18 is a schematic diagram of a cross section taken along line BB' in FIG. 17.

In view of the same inventive concept, another embodiment of the present disclosure further provides a display device. FIG. 17 is a structural schematic diagram of a display device according to an embodiment of the present disclosure, and FIG. 18 is a cross-sectional view taken along line BB' in FIG. 17. Referring to FIG. 17 and FIG. 18, the display device 200 includes a backlight module 201 as described above. The display device 200 further includes a liquid crystal display panel 202 located on a side of the backlight module 201, i.e., a light-emitting side of the backlight module 201. The backlight module provides backlight for the display panel. The backlight module is the same as described in the above embodiment.

It should be noted that the display device according to the present disclosure can be any product or component having display function, such as a mobile phone, a tablet computer, a television, a display, a notebook computer, a digital photo frame, a navigator, and a 3D printing system.

Since the light emitted by the backlight module is more uniform, the starry phenomenon of the backlight module is alleviated or even eliminated. Therefore, the display device according to the present disclosure can displays pictures in an improved quality.

It should be noted that the various embodiments in the present disclosure are described in a progressive manner, and the description of each embodiment focuses on the differences of this embodiment from others, and same or similar parts of these embodiments can be referred to each other.

It should also be noted that, in this context, relational terms such as "first", "second", and the like are used merely to distinguish one entity or one operation from another entity or another operation, but not to require or imply any such actual relationship or order thereof. Furthermore, the terms "comprise", "include", "contain" or other variations are intended to include elements in a non-exclusive manner. That is, an expression that an item or an equipment comprise a series of elements means that not only those elements are included, but also other elements that are not explicitly listed, or inherent element in this item or equipment are included. The phrase "including one" does not exclude that other elements are also included in the item or equipment.

What is claimed is:

1. A backlight module, comprising:
a substrate;
a plurality of LED chips arranged on a side of the substrate and electrically connected to the substrate; and
a first film disposed on a side of each of the plurality of LED chips facing away from the substrate, wherein each of the first films are formed in one piece,
wherein an orthographic projection of the at least one LED chip on a plane of the substrate is located within an orthographic projection of the first film on the plane of the substrate,
the first film has a plurality of channels penetrating through the first film,
each of the plurality of channels comprises a first side close to the at least one LED chip and a second side facing away from the at least one LED chip,
each of the plurality of channels is filled with a channel filling portion having a first end surface located on the first side and a second end surface located on the second side, the first film has a refractive index nl, and the channel filling portion has a refractive index n2, where n2>n1, wherein total reflection occurs when light emitted from the LED chips is transmitted in the channels, and
the first film has a first region and a second region surrounding the first region, an orthographic projection of the first region on the plane of the substrate at least partially overlaps with an orthographic projection of the at least one LED chip of on the plane of the substrate; in the first region, an area of the first end surface of the channel filling portion is smaller than an area of the second end surface of the channel filling portion in a same channel; and in the second region, an area of the first end surface of the channel filling portion is larger than an area of the second end surface of the channel filling portion in a same channel.

2. The backlight module according to claim 1, wherein the first end surface and the second end surface of the channel filling portion in a same channel have a same shape.

3. The backlight module according to claim 2, wherein the first end surface and the second end surface of the channel filling portion in a same channel both have a shape of circle or polygon.

4. The backlight module according to claim 3, wherein a center of the orthographic projection of the first region of the first film on the plane of the substrate coincides with a center of the orthographic projection of the at least one LED chip on the plane of the substrate.

5. The backlight module according to claim 1, wherein a material of the first film is polymethyl methacrylate, and the channel filling portion is poly(2-methylallyl benzothiazole-thiol ester).

6. The backlight module according to claim 1, wherein the plurality of LED chips is arranged on the substrate in a matrix.

7. The backlight module according to claim 1, further comprising a fluorescent film located on a side of the first film facing away from the plurality of LED chips.

8. The backlight module according to claim 1, further comprising a fluorescent film located on a side of the first film close to the plurality of LED chips.

9. A method for manufacturing a backlight module comprising:
a substrate;
a plurality of LED chips arranged on a side of the substrate and electrically connected to the substrate; and a first film disposed on a side of each of the plurality of LED chips facing away from the substrate, wherein each of the first films are formed in one piece, wherein an orthographic projection of the at least one LED chip on a plane of the substrate is located within an orthographic projection of the first film on the plane of the substrate, the first film has a plurality of channels penetrating through the first film, each of the plurality of channels comprises a first side close to the at least one LED chip and a second side facing away from the at least one LED chip, each of the plurality of channels is filled with a channel filling portion having a first end surface located on the first side and a second end surface located on the second side, the first film has a refractive index n1, and the channel filling portion has a refractive index n2, where n2>n1, wherein total reflection occurs when light emitted from the LED chips is transmitted in the channels, and the first film has a first region and a second region surrounding the first region, an orthographic projection of the first region on the plane of the substrate at least partially overlaps with an orthographic projection of the at least one LED chip of on the plane of the substrate; in the first region, an area of the first end surface of the channel filling portion is smaller than an area of the second end surface of the channel filling portion in a same channel; and in the second region, an area of the first end surface of the channel filling portion is larger than an area of the second end surface of the channel filling portion in a same channel, wherein the method comprises:

preparing the substrate and a finished film layer, wherein the plurality of LED chips is electrically connected to a surface of the substrate; and arranging the finished film layer on a side of the plurality of LED chips facing away from the substrate in such manner that the finished film layer covers at least one LED chip of the plurality of LED chips, wherein the finished film layer comprises a first film and a channel filling portion.

10. The method for manufacturing the backlight module according to claim 9, wherein a process of preparing the first film in the process of preparing the substrate and the finished film layer comprises:

preparing a first film having a plurality of channels extending therethrough; and filling each of the plurality of channels with the channel filling portion to form the finished film layer.

11. The method for manufacturing the backlight module according to claim 10, wherein the process of preparing the first film comprises:

providing a layer-shaped initial film layer, and forming a plurality of channels penetrating through the layer-shaped film by wet etching, so as to form the first film.

12. The method for manufacturing the backlight module according to claim 10, wherein the process off preparing the first film comprises:

providing a mold having a plurality of protrusions, wherein the plurality of protrusions has a same shape as the plurality of channels, and a protrusion height of the plurality of protrusions with respect to the mold is greater than or equal to a distance between the first end surface and the second end face, coating a material of the first film on regions of the mold other than the plurality of protrusions, solidifying the material of the first film so as to form the first film, and removing the mold from the first film.

13. The method for manufacturing the backlight module according to claim 10, wherein the process of filling each of the plurality of channels with the channel filing portion to form the first film comprises:

filling the plurality of channels with a material of the channel filling portion by coating.

14. A display device, comprising:

a display panel; and a backlight module configured to provide backlight to the display panel, wherein the backlight module comprises:

a substrate;

a plurality of LED chips arranged on a side of the substrate and electrically connected to the substrate; and a first film disposed on a side of each of the plurality of LED chips facing away from the substrate, wherein each of the first films are formed in one piece, wherein an orthographic projection of the at least one LED chip on a plane of the substrate is located within an orthographic projection of the first film on the plane of the substrate, the first film has a plurality of channels penetrating through the first film, each of the plurality of channels comprises a first side close to the at least one LED chip and a second side facing away from the at least one LED chip, each of the plurality of channels is filled with a channel filling portion having a first end surface located on the first side and a second end surface located on the second side, the first film has a refractive index n1, and the channel filling portion has a refractive index n2, where n2>n1, wherein total reflection occurs when light emitted from the LED chips is transmitted in the channels, and the first film has a first region and a second region surrounding the first region, an orthographic projection of the first region on the plane of the substrate at least partially overlaps with an orthographic projection of the at least one LED chip of on the plane of the substrate; in the first region, an area of the first end surface of the channel filling portion is smaller than an area of the second end surface of the channel filling portion in a same channel; and in the second region, an area of the first end surface of the channel filling portion is larger than an area of the second end surface of the channel filling portion in a same channel.

* * * * *